United States Patent [19]

Saeda et al.

[11] Patent Number: 4,489,195

[45] Date of Patent: Dec. 18, 1984

[54] PROCESS FOR PRODUCING THERMOPLASTIC OLEFINIC ELASTOMER

[75] Inventors: Shigeru Saeda; Zenichiro Izumi, both of Ohita, Japan

[73] Assignee: Showa Denko K.K., Tokyo, Japan

[21] Appl. No.: 462,148

[22] Filed: Jan. 31, 1983

Related U.S. Application Data

[63] Continuation of Ser. No. 306,930, Sep. 29, 1981, abandoned.

[30] Foreign Application Priority Data

Sep. 30, 1980 [JP] Japan .............................. 55-135248

[51] Int. Cl.³ .......................................... C08F 297/08
[52] U.S. Cl. .................................................. 525/323
[58] Field of Search ......................................... 525/323

[56] References Cited

U.S. PATENT DOCUMENTS 3,358,056  12/1967  Renaudo ............................ 525/323
4,284,739   8/1981  Zukowski .......................... 525/323

*Primary Examiner*—Paul R. Michl
*Attorney, Agent, or Firm*—Wenderoth, Lind & Ponack

[57] ABSTRACT

A process for producing a thermoplastic elastomer in the presence of a Ziegler catalyst which comprises a first step of forming polypropylene and then a second step of forming an ethylene/propylene random copolymer, characterized in that (a) the catalyst is used such that the total amount of the polymer formed is at least 50 kg per gram of titanium metal in the catalyst, (b) a hydrocarbon having 3 or 4 carbon atoms is used as a slurry polymerization solvent, (c) the solvent phase of the slurry is evaporated and separated without bringing the resulting polymer into contact with alcohols and/or hydrocarbons having at least 5 carbon atoms, (d) the polymerization temperature in the second step is adjusted to not more than 50° C., and (e) in the first step, polypropylene is formed in an amount of 5 to 50% by weight based on the total weight of the elastomer, and in the second step, the ethylene/propylene random copolymer having a propylene content of 5 to 60% based on the weight of the ethylene/propylene random copolymer and an intrinsic viscosity at 135° C. in decalin of 1.5 to 15 is formed in an amount of 50 to 95% by weight based on the total weight of the elastomer.

3 Claims, No Drawings

PROCESS FOR PRODUCING THERMOPLASTIC OLEFINIC ELASTOMER

This application is a continuation of Ser. No. 306,930, filed Sept. 29, 1981, now abandoned.

This invention relates to a novel process for producing a thermoplastic olefinic elastomer.

In recent years, various thermoplastic elastomers have been marketed which can be molded by the same processing methods as in the molding of thermoplastic resins, such as injection molding, blow molding, rotational molding and extrusion molding, and have suitable rubber-like flexibility. Because of their better processing efficiency and greater ease of regeneration than conventional crosslinked rubbers, these thermoplastic elastomers have come into use in various applications.

The thermoplastic elastomer denotes an elastomer which is designed by suitably arranging in a polymer molecule a soft segment which exhibits rubbery properties at service temperatures and a hard segment which is regarded as pseudo-crosslinking sites of crystals, glass and other materials so that it behaves as a crosslinked rubber at service temperatures and as a general thermoplastic resin at the processing temperatures. Various combinations of segments are possible by the selection of the soft segment and the hard segment, and thermoplastic elastomers so far provided are of the olefin, styrene, polyester, urethane, etc. types.

Among these various thermoplastic elastomers, those of the polyolefinic type find main applications in automobile parts and electric wires and cables because of their outstanding weatherability and suitable heat resistance.

The polyolefinic thermoplastic elastomer (sometimes to be referred to as TPE) is generally produced by blending an ethylene-propylene terpolymer (EPDM) or ethylene/propylene rubber (EPR) with an olefinic resin typified by polypropylene. Manufacturing techniques include, for example, a method which comprises partially crosslinking EPR or EPDM and then blending it with a polyolefin as disclosed in U.S. Pat. Nos. 3,758,643 and 3,862,106; a method which comprises performing crosslinking while mixing the rubbery component and the plastic component as disclosed in U.S. Pat. No. 3,806,558; a method which comprises kneading the two components and then crosslinking the kneaded mixture as disclosed in Japanese Laid-Open Patent Publication No. 1386/1979; a method which comprises using a high-molecular-weight rubber component while omitting crosslinking, as disclosed in U.S. Pat. No. 3,835,201, and methods which contemplate improvement of the properties of the product by adding a third component on the basis of the above techniques, as disclosed in U.S. Pat. Nos. 4,098,848 and 4,108,947, and Japanese Laid-Open Patent Publication Nos. 34739/1972 and 126450/1977.

However, the aforesaid conventional methods involve blending the rubbery component and the plastic component produced separately and are remote from the ideal type of thermoplastic elastomer in which a soft segment and a hard segment are properly arranged in the same molecule. Accordingly, the properties of the resulting elastomer still require improvement (for example, in respect of a balance between strength and flexibility), and the after-blending treatment is not economically desirable. Thus, most of the conventional techniques involve separately producing polypropylene or another olefinic resin and an olefinic copolymer rubber and then mixing them. It is well known that olefinic copolymer rubbers are generally produced by the solution technique, and this method is economically disadvantageous. This is one cause of the high cost of thermoplastic elastomers. Efforts to produce olefinic copolymers as a slurry are disclosed, for example, in U.S. Pat. Nos. 3,520,859 and 3,671,505 and Canadian Pat. No. 866,294, but no satisfactory result has been obtained.

On the other hand, Japanese Laid-Open Patent Publication No. 80418/1980 discloses a process for producing a propylene/ethylene block copolymer which comprises polymerizing propylene to form polypropylene in an amount of 20 to 50% by weight based on the total weight of the polymer, and then performing random copolymerization of propylene and ethylene to form a propylene/ethylene random copolymer in an amount of 80 to 50% by weight based on the total weight of the polymer. This process is improved in that the blending step required in the aforesaid prior methods can be omitted. However, according to the polymerization conditions (e.g., the type of the polymerization solvent, the polymerization temperature) and the after-treating method for the copolymer which are given in the working examples of the Japanese patent document, the process steps in the Japanese document are still complex and a product having uniform properties cannot be produced stably and economically.

In view of this state of art, the present inventors made extensive investigations in order to improve these prior techniques. These investigations have led to the discovery that a thermoplastic elastomer having excellent properties can be obtained economically by a two-step slurry polymerization method under specified conditions.

It is an object of this invention to improve the conventional techniques of blending a rubber component and a plastic component separately prepared, and to provide a process for economically producing a thermoplastic elastomer having excellent properties.

Thus, according to this invention, there is provided a process for producing a thermoplastic elastomer in the presence of a Ziegler catalyst which comprises a first step of forming polypropylene and then a second step of forming an ethylene/propylene random copolymer, characterized in that (a) the catalyst is used such that the total amount of the polymer formed is at least 50 kg per gram of titanium metal in the catalyst, (b) a hydrocarbon having 3 to 4 carbon atoms is used as a slurry polymerization solvent, (c) the solvent phase of the slurry is evaporated and separated without bringing the resulting polymer into contact with alcohols and/or hydrocarbons having at least 5 carbon atoms, (d) the polymerization temperature in the second step is adjusted to not more than 50° C., and (e) in the first step, polypropylene is formed in an amount of 5 to 50% by weight based on the total weight of the elastomer, and in the second step, the ethylene/propylene random copolymer having a propylene content of 5 to 60% based on the weight of the ethylene/propylene random copolymer and an intrinsic viscosity at 135° C. in decalin of 1.5 to 15 is formed in an amount of 50 to 95% by weight based on the total weight of the elastomer.

If required, the ethylene/propylene copolymer obtained by the above process can be crosslinked by using a crosslinking agent composed mainly of an organic peroxide.

One great feature of the invention is that a thermoplastic elastomer is produced by two-step polymerization under specified conditions by a slurry polymerization technique.

According to the process of this invention, polypropylene formed in the first-step reaction rises to the surface of the olefinic copolymer rubber formed in the second step. As a result, the olefinic copolymer rubber does not stick to itself and can be maintained in slurry. Thus, a thermoplastic elastomer can be produced at a stretch.

Furthermore, by performing the two-step polymerization, the catalyst used in the production of polypropylene or a propylene copolymer in the first step does not lose activity, and can be subsequently used in the second step. Presumably, therefore, the hard segment produced in the first step and the soft segment produced in the second step are chemically combined to form a block copolymer. Accordingly, the thermoplastic elastomer produced by the process of this invention exhibits superior properties without subsequently subjecting it to a crosslinking step.

Usually, polypropylene or a propylene copolymer and the olefinic copolymer rubber do not dissolve completely in each other, but are present as separate phases. A considerably high degree of kneading power is therefore required in order to produce a thermoplastic elastomer by the blending method. This is likely to lead to thermal degradation, and an excessively high specific energy is required. The blending method is therefore economically disadvantageous. In contrast, according to the process of this invention, the two phases are dispersed microscopically during the polymerization, and therefore, a thermoplastic elastomer can be produced without the need for a strong kneading power. The strength of the thermoplastic elastomer obtained by the present invention is increased outstandingly because of the presence of a network structure which extends through the two phases.

The starting material used in the first step of the process of this invention includes not only propylene monomer, but also a mixture of it with a small amount of a comonomer, for example an α-olefin such as ethylene, butene-1, 4-methyl-1-pentene, hexene-1 and octene-1. It should be understood therefore that in the present application, the term "polypropylene" is meant to include not only a homopolymer of propylene but also copolymers of propylene with a small amount of a comonomer such as those exemplified hereinabove.

A molecular weight controlling agent such as hydrogen may be added. Ethylene required for the formation of the ethylene/propylene copolymer in the second step is added to the reaction system immediately before the second-step reaction.

Ziegler catalysts widely used in the polymerization of α-olefins are used in the process of this invention for producing a thermoplastic elastomer. The catalyst should exhibit sufficient activity and impart crystallinity to the polymer in the production of polypropylene in the first step, and should have sufficient activity at low temperatures and give a soft segment having good properties in the production of the ethylene/propylene copolymer in the second step. In addition, the activity of the catalyst should be so high that at least 50 kg of a polymer can be formed per gram of titanium atom in the catalyst. Because of these properties of the catalyst, the thermoplastic elastomer can be produced without going through a step of substantially removing the catalyst.

A catalyst system composed of a solid component containing titanium and chlorine and as required, magnesium and an organoaluminum compound such as a trialkyl aluminum and as required a third component can be cited as a suitable example of the catalyst.

By properly selecting the type and amount of the catalyst, the catalyst can have such a high activity as can satisfy the aforesaid conditions. It has been found that, for example, good results can be obtained with a catalyst system composed of (1) a solid catalyst component obtained by contacting a solid produced by copulverizing a silicon compound having an Si—O—C bond and magnesium chloride, with an addition reaction product of titanium tetrachloride and an organic carboxylic acid ester and (2) an organoaluminum compound, preferably a trialkyl aluminum, in which the concentration of the organoaluminum is at least 0.2 millimole/liter and the mole ratio of aluminum to the titanium atom in the solid catalyst component (Al/Ti) is at least 2.

Examples of the solvent used in the invention are hydrocarbons having not more than 4 carbon atoms such as n-butane, isobutane, propane and propylene, and mixtures composed mainly of at least one of these hydrocarbons. Thus, propylene can serve both as the starting material and as the solvent in this invention.

In the first-step polymerization of the process of this invention, ordinary isotactic polypropylene is produced in slurry. According to one preferred embodiment, propylene monomer is used both as the starting material and the polymerization solvent, and polymerized in bulk at 40° to 90° C. in the presence of the aforesaid catalyst and hydrogen as a molecular weight controlling agent.

The first-step reaction is carried out such that polypropylene or a copolymer composed mainly of propylene which has an MFI (melt flow rate) of 0.1 to 200 is obtained in an amount of 5 to 50% based on the total weight of the final thermoplastic elastomer.

The first-step polymerization product is then transferred to the second-step reaction without interrupting the polymerization. In a batchwise operation, it is preferred that the second-step reaction be carried out under different polymerization conditions in the same reaction vessel. If desired, the second-step reaction may be carried out in a separate reactor. In a continuous operation, a first-step reactor and a second-step reactor are naturally required.

The reactors may be of a tubular circulating type, a tower type, or a vessel type.

In the second step, ethylene is fed into the polymerization system, and at a reaction temperature of not more than 50° C., an ethylene/propylene copolymer having a propylene content of 5 to 60%, preferably 15 to 45%, is formed in an amount of 50 to 95% by weight based on the total weight of the thermoplastic elastomer.

The polymerization temperature in the second step is desirably as low as possible in order to prevent adhesion of the copolymer rubber to itself and maintain it in a good slurry condition. If it is too low, the polymerization activity of the catalyst is reduced and the cost of removing the heat of reaction increases. Accordingly, the polymerization temperature in the second step is generally not more than 50° C., preferably 40° to 0° C.

The suitable propylene content (to be sometimes referred to as $F_P$) in the olefinic copolymer rubber produced in the second step is 5 to 60%. If it is low, the entire thermoplastic elastomer has a high hardness and a very high tensile strength. If the propylene content is higher, the elastomer has a lower hardness and a lower strength.

The suitable molecular weight of the polymer formed in the second step is such that its intrinsic viscosity (to be sometimes referred to as $[\eta]_{E/P}$) in decalin at 135° C. is 1.5 to 15, preferably 2 to 7. If the intrinsic viscosity is lower than 1.5, a sufficient tensile strength cannot be obtained. If it exceeds 15, sufficient moldability cannot be imparted.

The molecular weight of the polymer can be adjusted by increasing or decreasing the amount of a molecular weight controlling agent such as hydrogen.

The ratio of the amount of the polymer in the first step and the amount of the polymer in the second step is such that the amount of the former (to be sometimes referred to as $C_P$) is 5 to 50%, and the amount of the polymer in the second step (to be sometimes referred to as $C_{E/P}$) is 95 to 50%. By properly selecting the MFI in the first step, $C_{E/P}$ and $[\eta]_{E/P}$, the MFI of the final polymer can be adjusted to a range of 0.01 to 50 which indicates substantial moldability of the polymer.

As the percentage of the polymer in the first step is smaller the resulting elastomer has better rubbery property and is softer. If the percentage increases, the elastomer gradually becomes harder and behaves as a plastic.

If the percentage of the polymer in the first step is less than 5%, it is difficult to disperse the copolymer rubber in the second step as a good slurry.

It is not desirable to subject the polymer obtained after going through the first and second steps to an after-treatment conventionally performed for polypropylene, for example, contacting with an alcohol at relatively low temperature, or contacting with a hydrocarbon having at least 5 carbon atoms containing a small amount of an alkylene oxide or an alcohol. If such a treatment is carried out, the resulting polymer would stick to itself, or be partly dissolved, and its handlability would be reduced. Furthermore, the polymer would become heterogeneous, and cannot be produced stably. Desirably, the solvent phase of the polymer slurry is directly evaporated and separated, or the polymer slurry is washed in a known manner with a slurry solvent having not more than 4 carbon atoms as a countercurrent stream.

If the amount of the polymer formed in the first step exceeds 50% by weight, a so-called high impact propylene copolymer results whose properties and uses differ from those of the thermoplastic elastomer of the invention. It will be clearly seen from the foregoing description that even when a conventional process for producing a high impact propylene copolymer is carried out under such conditions which will give a polymer having the same composition as in the present invention, it is impossible to produce a thermoplastic elastomer stably in a slurry state.

Thermoplastic elastomers having various properties such as processability, flexibility and strength in balanced combinations can be produced by changing the ratio of the amounts of polymers to be formed in the first and second steps and the propylene content and molecular weight of the polymer formed in the second step within the above-specified ranges. Properties required of the final elastomer differ depending upon the desired uses and processing methods. For example, for use in electrical wires and cables, flexibility and sufficient strength are required, and molding is frequently effected by using an injection-molding method. For use in automotive parts, excellent processability is the most important property.

Another advantage of the thermoplastic elastomer produced by the process of this invention is that the resulting polymer has sufficient properties in the non-crosslinked state. Good properties can be obtained especially when the copolymer rubber obtained in the second step has an intrinsic viscosity of at least 3. Furthermore, the thermoplastic elastomer of the invention has the advantage that because it is colorless in the non-crosslinked state, it can be freely colored by using coloring agents.

When permanent compression set is an important desired property, the polymerization product may be partially crosslinked to form a crosslinked thermoplastic elastomer. Since the crosslinking reaction must be carried out at a temperature above the crystal melting point of polypropylene, it is preferred to choose crosslinking agents of the organic peroxide type which decompose at high temperatures. Examples include 2,5-dimethyl-2,5-di(t-butylperoxy)hexyne-3, di-t-butyl peroxide, 2,5-dimethyl-2,5-di(t-butylperoxy)hexane, di(t-butylperoxy)diisopropylbenzene, dicumyl peroxide, t-butylperoxy benzoate, 1,1-bis(t-butylperoxy)-3,3,5-trimethylcyclohexane, 2,4-dichlorobenzoylperoxide, benzoyl peroxide, and p-chlorobenzoyl peroxide. Two or more of these organic peroxides may be used in combination, or a general crosslinking aid may be used together. The amount of the peroxide is 0.01 to 1.0 part by weight as the amount of active components, per 100 parts by weight of the polymer. The amount of the crosslinking agent is determined mainly depending upon the required properties of the final thermoplastic elastomer. It is preferred to use the crosslinking agent in a large amount when rubbery elasticity is an important property required, and in a small amount when processability is of utmost importance.

It is possible to add to the thermoplastic elastomer of the invention various auxiliary components such as antioxidants, ultraviolet inhibitors, antistatic agents and coloring agents.

A considerably high degree of kneading must be effected in the production of a thermoplastic elastomer by a conventional blending method. According to the process of this invention, however, the two phases are microscopically dispersed during polymerization, and therefore, strong kneading is not required. The thermoplastic elastomer can be produced by this invention economically without any likelihood of thermal degradation by means of an ordinary single-screw or twin-screw extruder.

The following examples illustrate the present invention more specifically.

The various properties in the following examples were measured by the methods described below.

(1) MFI: JIS (Japanese Industrial Standards) K-6755
(2) Tensile strength: JIS K-6301
(3) Shore A hardness: ASTM D-676-49
(4) Permanent compression set: JIS K-6301
(5) $C_{E/P}$ and $F_p$: Measured by an infrared absorption spectroscopic method. The measurement was effected at 140° C. and 760–690 kayser (cm$^{-1}$) by using a melting infrared method.
(6) $[\eta]_{E/P}$: Solution viscosity in decalin at 135° C.

EXAMPLE 1

A solid catalyst component (A) was prepared by co-pulverizing magnesium chloride and tetraethoxysilane and supporting the reaction product of titanium tetrachloride and ethyl benzoate on the resulting solid component.

A 1.5-liter stainless steel autoclave was charged with 15.6 mg of the solid catalyst component (A), triethyl aluminum (an organoaluminum), ethyl benzoate (an electron donor), and 300 g of propylene. The amounts of the triethyl aluminum and ethyl benzoate were 300 mole ppm and 75 ppm, respectively, based on the propylene. Furthermore, 0.3 mole% of hydrogen was introduced into the autoclave.

The autoclave was rapidly heated to 70° C., and maintained at 70° C. for 10 minutes.

Then, the autoclave was abruptly cooled to 30° C., and 16 mole% of ethylene was added. The polymerization was continued for 50 minutes. Then, the gases in the autoclave were released to terminate the polymerization. Without any after-treatment, the product was dried in vacuum to give 71 g of a powdery thermoplastic elastomer. The polymerization activity was 4770 g/g of the solid catalyst component.hour which corresponded to about 197 kg of the polymerization product per gram of titanium metal. At this level, no after-treatment step for removal of the catalyst was required.

To 100 parts by weight of the powdery elastomer were added 0.05 part by weight of 2,6-di-t-butyl p-cresol, 0.2 part by weight of dimyristyl thiodipropionate, 0.05 part by weight of tetrakis[methylene-3-(3',5'-di-t-butyl-4'-hydroxyphenyl)propionate]-methane and 0.2 part by weight of calcium stearate. The mixture was kneaded in an atmosphere of nitrogen by an extruder with a screw diameter of 20 mm to form pellets.

When the resulting sample pellets were analyzed, it was found that the percentage ($C_p$) of polypropylene in the first step was 38.3%; and the percentage ($C_{E/P}$) of the ethylene/propylene copolymer in the second step was 61.7%. The product of the second-step reaction had a propylene content ($F_p$) of 39.0%. The second-step product had an intrinsic viscosity, $[\eta]_{E/P}$ of 4.6 (dl/g) in decalin at 135° C.

The sample pellets were compression-molded, and the tensile strength, elongation and Shore A hardness of the molded products were measured. The results are shown in Table 1.

It is clearly seen from Table 1 that the polymer obtained in this Example had excellent properties, especially strength and elongation, as a thermoplastic elastomer.

COMPARATIVE EXAMPLE 1

60% by weight of commercial EPR having a Mooney viscosity (ML 100° C.) of 40 and 40% by weight of commercial polypropylene having a melt flow rate (MFI) of 8.0 were kneaded at 180° C. for 5 minutes by means of a 3-inch roll. The resulting sheet-like sample was compression molded, and the tensile strength, elongation and Shore A hardness of the molded article were measured. The results are shown in Table 1. The product had a tensile strength of as low as 39 kg/cm² and a low elongation.

COMPARATIVE EXAMPLES 2 TO 4

Example 1 was repeated except that $C_P$, $C_{E/P}$, $F_P$ and the polymerization temperature in the second step were changed as shown in Table 1. In all runs, the powder stuck to itself, and the slurry and powder were difficult to handle. Stable production of an elastomer was impossible.

COMPARATIVE EXAMPLE 5

Polymerization of propylene and random copolymerization of ethylene and propylene were carried out by using 400 cc of n-hexane as a polymerization solvent while maintaining the polymerization temperatures in the first and second steps at 60° C.

The catalyst and polymerization conditions were the same as in Example 1 except that the amount of propylene added was 150 g and the polymerization temperatures were changed as above. After the polymerization, ethylene and propylene were discharged. The polymerization product was a viscous white suspension, but a part of the polymer dissolved and the polymer could not be obtained as a complete slurry. The suspension was poured into methanol to precipitate the polymer. 82 g of a lumpy polymer was obtained.

COMPARATIVE EXAMPLE 6

Example 1 was repeated except that $C_P$, $C_{E/P}$ and the polymerization temperature in the second step were changed as shown in Table 1. The product was not a thermoplastic elastomer but a so-called high impact propylene copolymer.

EXAMPLES 2 TO 5

Example 1 was repeated except as shown in Table 2. The results are shown in Table 1.

TABLE 2

| Example | Conditions for polymerization in the first step | | Conditions for polymerization in the second step | | |
|---|---|---|---|---|---|
| | Amount of butene-1 added (mole %) | Polymerization time (min.) | Hydrogen (mole %) | Ethylene (mole %) | Polymerization time (minutes) |
| 2 | 0 | 8 | 0.3 | 40 | 80 |
| 3 | 0 | 8 | 0.5 | 30 | 80 |
| 4 | 0 | 5 | 0.17 | 10 | 85 |
| 5 | 4 | 8 | 0.5 | 30 | 80 |

It is seen from the above table that by changing the polymerization conditions, elastomers having flexibility, strength and rubbery elasticity in various balanced combinations can be produced.

COMPARATIVE EXAMPLE 7

EPR and polypropylene were blended under the conditions shown in Table 1 in the same way as in Comparative Example 1. The resulting product had substantially the same Shore A hardness as in Example 2, but its tensile strength and elongation were low.

EXAMPLE 6

Six grams of AA-type titanium trichloride and 0.9 g of γ-butyrolactone were pulverized for 17.5 hours in a vibratory ball mill. An autoclave was charged with 20.2 mg of the resulting solid titanium catalyst component, diethyl aluminum monochloride and 300 g of propylene. The amount of diethyl aluminum was 300 mole ppm based on the propylene. Furthermore, 0.4 mole % of hydrogen was added.

The autoclave was rapidly heated to 70° C., and maintained at this temperature for 20 minutes. Then, the autoclave was abruptly cooled to 40° C., and 14 mole% of ethylene was added. The polymerization was continued for 40 minutes. There was obtained 298 g of a thermoplastic elastomer. The properties of the elastomer were measured in the same way as in Example 1, and the results are shown in Table 1. The total amount of the polymer corresponded to 68 kg per gram of titanium metal.

EXAMPLES 7 AND 8

In each run, a thermoplastic elastomer having the composition shown in Table 1 was crosslinked by the method shown below, and a crosslinked thermoplastic elastomer having the properties shown in Table 1 was obtained.

Method of crosslinking and pelletization:

One hundred parts of the elastomer powder was mixed with 0.2 part of dicumyl peroxide and 0.4 part of m-phenylenebismaleimide and crosslinked in an extruder having a screw diameter of 20 mm while maintaining the metering section and die section at 230° C. Then, by using the same extruder, the crosslinked polymer was granulated after adding as stabilizers 0.05 part of 2,6-di-t-butyl p-cresol, 0.05 part of tetrakis[methylene-3-(3′,5′-di-t-butyl-4′-hydroxyphenyl)propionate]methane, 0.2 part of dimyristyl thiodipropionate and 0.2 part of calcium stearate.

(a) the catalyst is composed of (1) a solid component containing titanium, magnesium and chlorine and (2) an organoaluminum compound, with or without (3) a third component, and the catalyst is used such that the total amount of the elastomer formed is at least 50 kg per gram of the titanium metal in the catalyst, (b) propylene is used as a slurry polymerization solvent as well as a starting material, (c) the solvent phase of the slurry is evaporated and separated without bringing the resulting elastomer into contact with alcohols and/or hydrocarbons having at least 5 carbon atoms, (d) the polymerization temperature in the second step is adjusted to not more than 50° C., and (e) in the first step, polypropylene is formed in an amount of 5 to 38.3% by weight based on the total weight of the elastomer, and in the second step, the ethylene/propylene random copolymer having a propylene content of 5 to 60% based on the weight of the ethylene/propylene random copolymer and an intrinsic viscosity at 135° C. in decalin of 1.5 to 15 is formed in an amount of 61.7 to 95% by weight based on the total weight of the elastomer.

2. A process according to claim 1, wherein the polypropylene formed in the first step rises to the surface of the ethylene/propylene random copolymer formed in the second step so as to maintain a microscopic dispersion of the polypropylene and random copolymer in each other during the polymerization.

3. A process for producing a thermoplastic elastomer which comprises crosslinking the polymerization product obtained by the process of claim 1 with a crosslinking agent composed mainly of an organic peroxide.

TABLE 1

| | First Step | | Second step | | | | Polymer produced | | | | |
|---|---|---|---|---|---|---|---|---|---|---|---|
| | MFI | $C_P$ | $C_{E/P}$ | $F_P$ | $[\eta]_{E/P}$ | Temperature (°C.) | Tensile strength (kg/cm²) | Elongation at break (%) | Shore A hardness | Permanent compression set | State of the powder |
| Ex. 1 | 6.5 | 38.3 | 61.7 | 39.0 | 4.6 | 30 | 110 | 700 | 93 | 58 | Good |
| CEx. 1 | 8.0 | 40 | 60 | 48.1 | 1.5 | — | 39 | 350 | 96 | — | — |
| CEx. 2 | 6.5 | 3 | 97 | 39.0 | 4.5 | 30 | 35 | 600 | 78 | — | Stuck |
| CEx. 3 | 6.5 | 21.1 | 78.9 | 45.4 | 3.5 | 60 | 85 | 650 | 85 | — | Stuck |
| CEx. 4 | 6.5 | 25.2 | 74.8 | 70.0 | 2.5 | 50 | 65 | 700 | 72 | — | Stuck |
| CEx. 5 | 7.5 | 40.5 | 59.5 | 42.0 | 3.8 | 60 | — | — | — | — | Stuck |
| CEx. 6 | 6.5 | 69.4 | 30.6 | 42.0 | 4.8 | 40 | 260 | 720 | 100 | — | Good |
| Ex. 2 | 4.5 | 26.7 | 73.3 | 17.6 | 3.8 | 30 | 219 | 800 | 92 | 51 | Good |
| CEx. 7 | 8.0 | 30 | 70 | 19.2 | 4.0 | — | 144 | 390 | 91 | — | — |
| Ex. 3 | 4.5 | 26.7 | 73.3 | 24.2 | 4.3 | 30 | 82 | 740 | 83 | 56 | Good |
| Ex. 4 | 4.5 | 17.4 | 82.6 | 48.6 | 4.8 | 30 | 42 | 900 | 65 | 51 | Good |
| Ex. 5 | 4.5 | 25.2 | 74.8 | 25.0 | 4.2 | 30 | 95 | 820 | 80 | 53 | Good |
| Ex. 6 | 8.0 | 28.0 | 72.0 | 41.0 | 5.2 | 40 | 65 | 700 | 85 | 52 | Good |
| Ex. 7 | 8.0 | 21.8 | 78.2 | 48.2 | 2.5 | 30 | 40 | 640 | 60 | 39 | Good |
| Ex. 8 | 8.0 | 28.3 | 71.7 | 24.8 | 4.5 | 30 | 128 | 750 | 73 | 29 | Good |

What we claim is:

1. A process for producing a thermoplastic elastomer by a slurry polymerization technique in the presence of a Ziegler catalyst, which comprises a first step of forming polypropylene and then a second step of forming an ethylene/propylene random copolymer, wherein